(12) United States Patent
Allen et al.

(10) Patent No.: US 7,111,941 B2
(45) Date of Patent: Sep. 26, 2006

(54) METHOD AND APPARATUS FOR MULTIPLE-RESOLUTION LIGHT VALUE PROJECTOR

(75) Inventors: William Allen, Corvallis, OR (US);
David A. Williams, Corvallis, OR (US); Thomas J. Gilg, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 240 days.

(21) Appl. No.: 10/926,232

(22) Filed: Aug. 25, 2004

(65) Prior Publication Data

US 2006/0044518 A1    Mar. 2, 2006

(51) Int. Cl.
G03B 21/00   (2006.01)
G03B 21/14   (2006.01)
G03B 21/28   (2006.01)
G02F 1/1335  (2006.01)
H04N 5/74    (2006.01)

(52) U.S. Cl. .............. 353/31; 353/84; 353/99; 349/5; 349/7; 348/743

(58) Field of Classification Search ........... 353/31, 353/84, 94, 99; 348/743; 349/5, 7
See application file for complete search history.

(56) References Cited

U.S. PATENT DOCUMENTS

| 5,493,335 | A  | * | 2/1996  | Parulski et al. ......... 348/231.6 |
| 5,868,480 | A  | * | 2/1999  | Zeinali ..................... 353/31 |
| 6,276,801 | B1 |   | 8/2001  | Fielding |
| 6,570,613 | B1 |   | 5/2003  | Howell |
| 6,591,022 | B1 |   | 7/2003  | Dewald |
| 6,624,726 | B1 |   | 9/2003  | Niu et al. |
| 6,817,717 | B1 | * | 11/2004 | Childers et al. ......... 353/31 |
| 6,891,672 | B1 | * | 5/2005  | Whitehead et al. ...... 359/443 |
| 2003/0048393 | A1 | | 3/2003 | Sayag |
| 2003/0142224 | A1 | | 7/2003 | Fukuda et al. |

* cited by examiner

*Primary Examiner*—Melissa Jan Koval

(57) ABSTRACT

A projected image is created by receiving an image represented in a colorspace onto a projector device. The image is parsed into two or more color image components of the colorspace having two or more different resolutions. The two or more color image components of the colorspace are projected in two or more different resolutions superimposed and coincident with each other to make the image.

42 Claims, 6 Drawing Sheets

METHOD AND APPARATUS FOR MULTIPLE-RESOLUTION LIGHT VALUE PROJECTOR

BACKGROUND

The present invention relates to displaying images with digital projectors. Digital projectors are becoming a common tool for both business and entertainment. As these devices become more affordable, many offices and conference rooms have permanently installed digital projectors for sales presentations, reports and conferences. Movie theaters are also realizing the value of digital technology and gradually converting from analog film projectors to their digital counterparts. Further improvements in cost and quality of these devices will make the digital projector a common place addition to home entertainment and theatre systems. Of course, the adoption of this technology would be even faster if the cost and complexity of these systems could be further reduced.

Conventional projector systems use one or more "light valves" for generating different color components in an image. Light valves are also known more generally as spatial light modulators (SLM). For example, a total of three light valves are typically used in projectors displaying images in an RGB (red/green/blue) colorspace—one for each color component. Several technologies for implementing these light valves currently exist in the market. One projector technology creates each color component in the image by passing light through liquid crystal display (LCD) panels. Another projector technology reflects light off digital micromirror devices (DMDs) to create the desired image. Yet another technology operates by reflecting the various color components off a liquid crystal on silicon (LCoS) device. Other emerging projector technologies incorporate grating light valve (GLV), nanotube, or diffractive light device (DLD) technologies for generating the various color components.

In each case, a large part of the projector cost arises from the light-valve components. Light-value components operating with higher resolution and faster switching times allow the projectors to reproduce higher resolution and more realistic images. Of course, fabricating these light valves remains increasingly complex and expensive even though the demand for higher resolution projectors continues to increase. Accordingly, the overall projector cost depends on the number of color components in the color model and the corresponding number of light valves used to represent these color components. For example, conventional high resolution projectors operating in the RGB (red, green and blue) colorspace require three high resolution color valves to generate the desired high resolution image or video on a screen.

It is important for the development of these projectors to further reduce their cost while maintaining or improving the quality and resolution of the images being produced.

BRIEF DESCRIPTION OF THE DRAWINGS

The present invention is illustrated by way of example and not limitation in the figures of the accompanying drawings.

SUMMARY OF THE INVENTION

Figure 1:
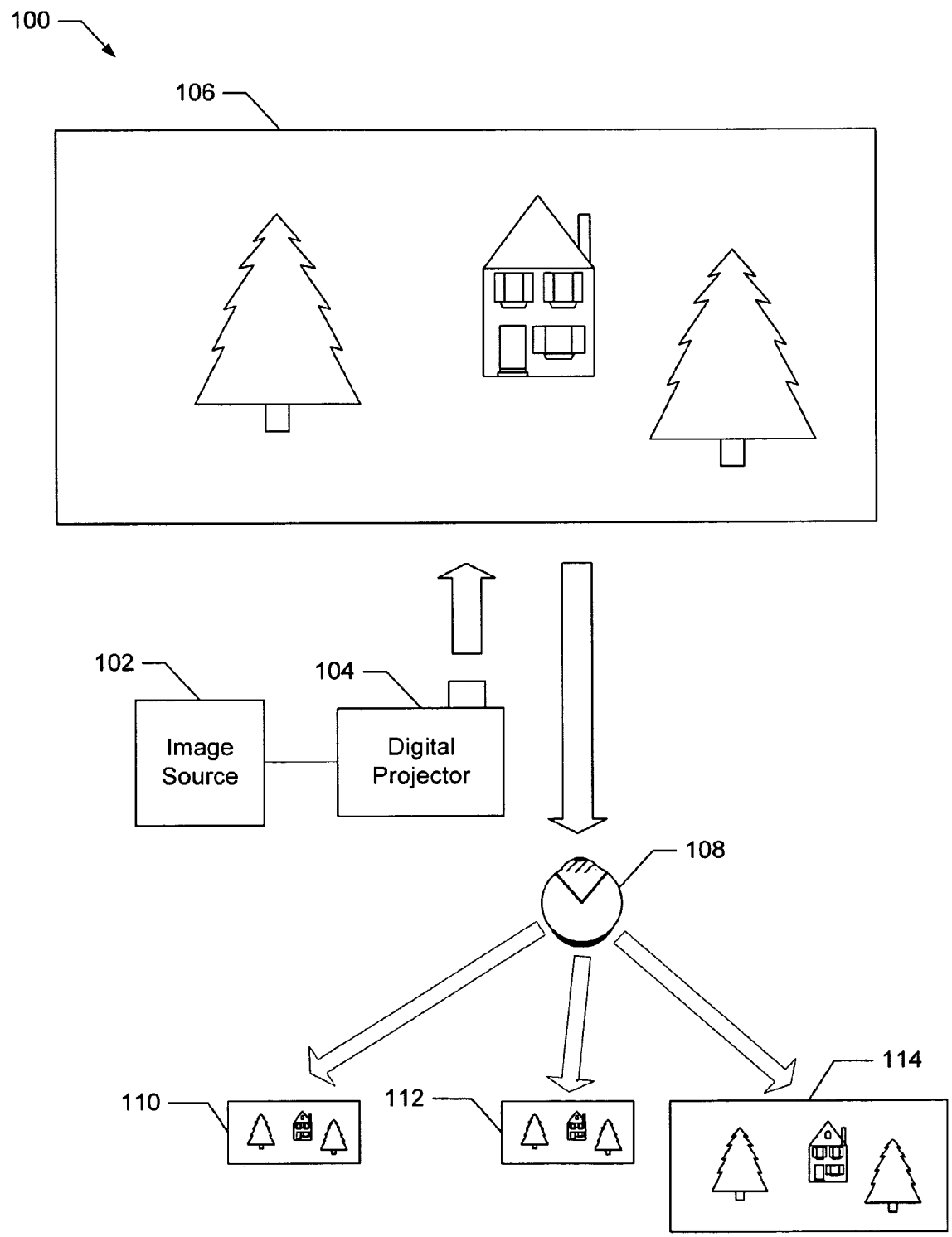
FIG. 1 is a schematic showing a digital projector system implemented in accordance with one embodiment of the present invention projecting an image onto a screen.

One aspect of the present invention describes projector apparatus that display colors at different resolutions. A projected image is created by receiving an image represented in a colorspace onto a projector device. The image is parsed into two or more color image components of the colorspace having two or more different resolutions. The two or more color image components of the colorspace are projected in two or more different resolutions superimposed and coincident with each other to make the image.

DETAILED DESCRIPTION

Embodiments of the present invention use multiple light valves with different resolutions to generate images in a digital projector. Lower resolution and lower cost light valves are used to represent the color spectrum in which the human visual system has lower sensitivity. In the other areas of the color spectrum, higher resolution (generally more expensive) light valves are used to match the higher sensitivities of the human visual system. For example, a projector implemented in accordance with the present invention uses lower resolution (generally less-expensive) light valves for reproducing the red and blue components and higher resolution and more expensive color valves for reproducing the green components in the RGB colorspace. Projectors designed in accordance with embodiments of the present invention implement scaling and combining optics along with image processing to ensure the images produced by these different resolution light valves are properly combined as they are projected by the projector. Projectors designed in accordance with embodiments of the present invention are generally lower in cost and yet maintain high resolution.

Aspects of the present invention have at least one or more of the following advantages. Digital projectors can be produced at a lower cost using currently available light valve technology. Implementing embodiments of the present invention does not require special light valves and instead can be applied to both current and future technologies. Embodiments of the present invention take advantage of these lower cost components to reduce costs of manufacturing the digital projector without reducing the perceived quality and resolution of the images produced. Lowering the resolution of certain light valves in the projector in accordance with the invention leads to a final image with generally imperceptible differences from images from higher resolution conventional projectors.

The digital projectors designed in accordance with embodiments of the present invention remain compatible with other technologies and data formats. High resolution video and image data is processed by digital projectors of the present invention to work with light valves of different resolutions. The image source providing the data to be displayed does not need special drivers or require pre-processing of the data to work with embodiments of the present invention. Instead, embodiments of the present invention transmit the proper image information to the different resolution light valves and then scale and combine the results into a high resolution image.

FIG. 1 is a schematic showing a digital projector system 100 implemented in accordance with the present invention projecting an image onto a screen. System 100 includes an image source 102, a digital projector 104 (hereinafter projector 104), a screen image 106, and human eye 108 with perceived red color component 110, blue color component 112, and green color component 114.

In operation, image source 102 provides images or video content to be displayed through projector 104. In some embodiments, each image or video provided by image source 102 is at least at the resolution capable of being reproduced by projector 104. In one embodiment, image source 102 is a desktop computer or general-purpose computing device, however, alternatively image source 102 could be any other device capable of creating images, video or other types of content. For example, the image source 102 could also be a laptop computer capable of generating video and still images under the control of one or more software applications. Further, image source 102 could also be one of many more conventional consumer devices including a video cassette recorder (VCR), cable boxes, video cameras, digital video disc (DVD) player, or television tuner. Connectivity and transmission of signal between image source 102 and projector 104 includes: a radio-frequency (RF) transmission device, coaxial cable input, S-Video, Digital Video Input (DVI), Composite Video, Analog Component Video, DVB, NTSC, PAL, SECAM, and other connectivity and transmission protocol types and/or formats.

Projector 104 illustrated in FIG. 1 represents one embodiment of the present invention using light valves of differing resolutions. In this particular illustration, projector 104 includes a lower resolution red light valve, a lower resolution blue light valve, and a higher resolution green light valve. In one embodiment of the present invention, the red and blue light valves operate with only XGA (i.e., 1024× 768) or SVGA (i.e., 800×600) resolution respectively while the green light valve operates at SXGA (i.e., 1280×1024) resolution. Even less-expensive light valves can be had by lowering the refresh rate used for the non-green channels. For example, the non-green light valves may have a refresh-rate less than that of the green light valve. This effectively lowers the resolution of the non-green channels over time by decreasing their relative correspondence to the green channel. Also, less-computing-intensive production processing can be used to produce the non-green channels.

Each light valve in projector 104 can be any spatial light modulator in general and can be implemented using one or more different types of light valve technologies. For example, the light valves can be implemented using a digital micromirror device (DMD), a liquid crystal display (LCD) device, a liquid crystal reflector on silicon (LCoS) device, or a diffractive light device (DLD). Other spatial light modulators such as light generating modulators may be used, for instance, a light emitting diode (LED) array. It is contemplated that aspects of the present invention can be readily adapted to many other technologies including many currently under development and not widely available. Implementing aspects of the present invention to each of these light valve technologies would generally result in greater efficiencies as long as multiple distinct color components were being used in each of the projectors.

In this example, screen image 106 contains greater resolution in the green channel than in the red or blue channels. Each projector 104 designed in accordance with the present invention produces images with lower resolution in the range of the color spectrum that the human eye cannot readily detect as previously described. In this example, projector 104 generating screen image 106 can be implemented as either a rear-projection or front-projection screen device.

Human eye 108 receives screen image 106 by focusing the reflected light on the retina within human eye 108. After passing through the focusing mechanism of human eye 108, screen image 106 excites photoreceptors on retina typically referred to as "cones". Approximately 120 million rods in the retina are available to sense both color and luminosity. The cones' sensitivity to both color and luminosity are concentrated at the center of the retina in the "macula" under a yellow filter. In the middle of the macula region lays a relatively small area with very densely packed cones referred to as the "fovea centralism"

Color and image details in the fovea centralis are detected with red-, green-, and blue-sensitive cones—but not in equal detail. "Green" cones are more sensitive than their red and blue siblings. Blue cones are particularly insensitive, and play very little role in discerning detail and contrast in an image. To compensate for the blue cone insensitivity, human vision performs post-detection amplification and processing. For example, the visual system infers the blue light levels in various areas of the image to make up for this deficiency in sensitivity. This "slight of hand" allows the human visual system to perceive vivid color images even though the blue light is detected with only about a quarter the resolution of the red and green light.

Consequently, these excited photoreceptors in human eye 108 generate the viewer's visual perception of screen image 106. For purposes of explanation, FIG. 1 illustrates the red, green and blue component parts of screen image 106 schematically represented by a red image 110, a blue image 112 and a green image 114 that each land on the retina in human eye 108. This description and illustration simplifies the complex processing taking place in the human visual system for purposes of explanation. Nevertheless, this effectively illustrates the particular human visual characteristic exploited by embodiments of the present invention.

In particular, aspects of the present invention exploit the differential perception of the color and luminosity of images as they are projected onto the fovea centralis or central "foveal" area of the retina. Accordingly, projector 104 presents red image 110 and blue image 112 at lower resolutions than green image 114 yet remains capable of providing substantially the same perceived resolution to the human visual system. Inherent sensitivity to luminance by the human eye makes it more important to transmit higher resolution green light as it carries more luminance information in a color image than the red light or blue light. Essentially, the retina in human eye 108 cannot detect that projector 104 designed in accordance with the embodiments of the present invention is utilizing lower resolution red and blue light valves compared with a higher resolution green light valve. Accordingly, a projection system delivering relatively less resolution over the red and blue channels in accordance with implementations of the present invention delivers essentially equivalent image quality as a projector designed with higher resolution on all three color channels.

Figure 2:
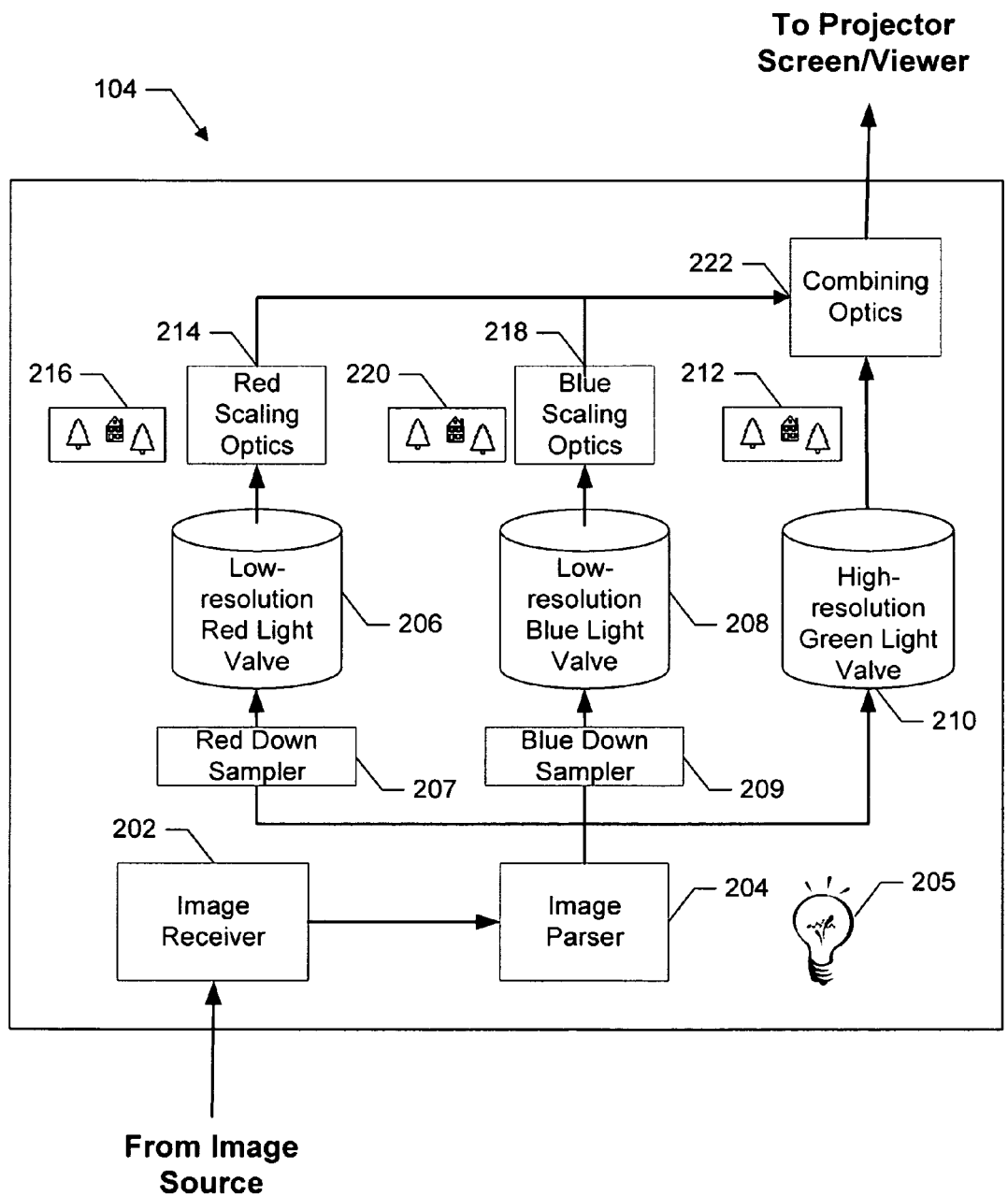
FIG. 2 is a schematic illustrating a few of the internal components in a projector designed accordance with one embodiment of the present invention.

FIG. 2 is a schematic illustrating the internal components in projector 104 in accordance with one embodiment of the present invention. Projector 104 includes an image receiver 202, an image parser 204, a low resolution red light valve 206 with red downsampler 207 and red scaling optics 214, a low resolution blue light valve 208 with blue downsampler 209 and blue scaling optics 218, a high resolution green light valve 210, and combining optics 222. A light source 205 provides light to the aforementioned light valves and an image source (not illustrated) provides images and video. The resulting images output from projector 104 are displayed on a screen (not illustrated) as previously described.

In operation, an image source transmits the images to image receiver 202 in projector 104. Image receiver 202 handles any protocol conversion and buffering necessary to facilitate data transmission and communication between the image source and projector 104. In some instances, image receiver 202 may be required to convert the images received into an internal data format as it is processed and used within projector 104. For example, digital still images may be provided and formatted in GIF, JPEG, or TIF or other still image formats requiring decoding and/or decompression. Similarly, image receiver 202 can also process digital video images provided and formatted in protocols compatible with MPEG, AVI, RM, and any other type of digital video format.

Image receiver 202 prepares the image data as previously described and then passes the results to image parser 204. In the illustrated embodiment, image parser 204 separates the data describing the received images into signals and/or control sequences suitable for the light valves corresponding to the components in the RGB colorspace or any other colorspace. Image parser 204 may be a software program, an analog circuit, a digital circuit, or some other processing mechanism.

Downsampling is another operation performed by embodiments of the present invention as fewer pixels are needed by the lower resolution light valves. In one embodiment, red down sampler 207 and blue down sampler 209 downsamples, as necessary, the higher resolution digital data from the received images to the corresponding resolution of a given light valve. For instance, a digital signal processor implemented in red down sampler 207 or blue down sampler 209 in either software or hardware downsamples the non-green images received in a higher resolution to a lower resolution using a pixel averaging algorithm, a region averaging algorithm, a pixel decimation algorithm, or a scan-line selection mechanism. Details on the downsampling performed depends on the size (often measured diagonally) of the light valve, the effective pixel density/resolution and/or pixel pitch and is described in further detail later herein.

As illustrated, each light valve reproduces a color component of the image in a given colorspace and at the respective resolution of the particular light valve. In one embodiment of the present invention, the non-green light valves (i.e., red and blue light valves) have a smaller diagonal measurement or geometric size and therefore are limited to providing less resolution than a larger green light valve 210 measured similarly across a diagonal and having a similar pixel pitch. Pixel pitch provides one measure of pixel density as it is a distance measurement between the center of two square or similarly shaped pixels. By reducing the geometric size of the non-green light valves, more non-green light valves can be manufactured from a given wafer while using a consistent pixel pitch or pixel density per square area. The smaller geometric area used for each non-green light valve also increases yield and productivity as a defect on the wafer affects less area of the wafer. This leaves a much larger absolute number of the light valves available for use as a larger number of light valves can be created from a given wafer despite the few light valves discarded due to defects. This approach controls the resolution of the non-green light valves by reducing the geometric area of the non-green light valve rather than specifying larger pixels or pixel pitch sizes.

Using smaller geometry non-green light valves also requires the non-green image sizes to be scaled to match the effective image size produced by green light valve. This is true even though the pixel pitch (i.e., the measurement between a pair of adjacent pixels) is the same for the green light valve and non-green light valves alike. Accordingly, one embodiment of the present invention, passes the output from the lower resolution non-green light valves through scaling optics that scales the image sizes being generated at the lower resolution to the size of the image or images being generated at the higher resolution. Specifically, the illustrated example embodiment uses red scaling optics 214 and blue scaling optics 218 to scale the red image 216 and blue image 220 to match the size of green image 212 being produced by the geometrically larger green light valve 210. Once properly scaled, embodiments of the present invention combine the three component color images within the projector apparatus prior to the light exiting the apparatus using combining optics 222. Alternative embodiments of the present invention may combine the three images outside the projector apparatus prior to the light impacting the screen. This latter embodiment would require one to mechanically target the images to coincide at a screen outside projector 104 thus having more setup and calibration requirements than the former embodiment.

An alternate implementation uses light valves of the same geometric size but differing pixel pitch. The non-green light valves use a material having fewer pixels thus presumably available at a lower cost. For example, red light valve 206 and blue light valve 208 may use a pitch size of 28 micron while green light valve 210 uses a higher pitch size of 14 micron, thus effectively providing more resolution for the green image portion of an image. By using the same geometric size, however, red scaling optics 214 and blue scaling optics 218 are not required as the resulting non-green images automatically match up to the green image as they reach combining optics 222.

Yet another embodiment of the present invention varies both the geometric size and pixel pitch of the non-green light valves as well as the degree of scaling performed by scaling optics. In this embodiment, non-green light valves can have different geometric area (i.e., different diagonal measurement) as well as different pixel pitch compared with green light valve 210. In practice, this would allow the combination of non-green and green light valves even though they have different pixel pitch and diagonal measurement. This is useful during manufacture when sourcing light valves from multiple or different manufacturers that each may manufacture light valves with slightly different specifications.

One embodiment of the present invention keeps the geometric size and pixel pitch of the non-green and green light valves the same, but uses "wobulation" to increase the resolution of green light valve. "Wobulation" increases perceived resolution by physically shifting sub-frames of an image. Thus, a projector using three conventional low resolution light valves may have "wobulation" applied to the green light valve to increase its effective perceived resolution. Since the human eye is most sensitive to the green resolution, the perceived resolution of the overall image is increased with little additional cost. In addition, by just using wobulation on the green modulator (and optionally the red modulator), the increased computation needs to perform "wobulation" is reduced compared to conventional three color "wobulation." In addition, in a color time sequenced system, such as a digital mirror device system with a color wheel, a single light valve with a given resolution may be used. When the time period for the green is present from the color wheel, the DMD device may be wobulated to increase the effective green resolution and thereby ultimately the perceived resolution of the entire image. "Wobulation" is described in commonly assigned application Ser. No. 10/213,555, filed Aug. 7, 2002, and incorporated herein by reference.

Figure 3A:
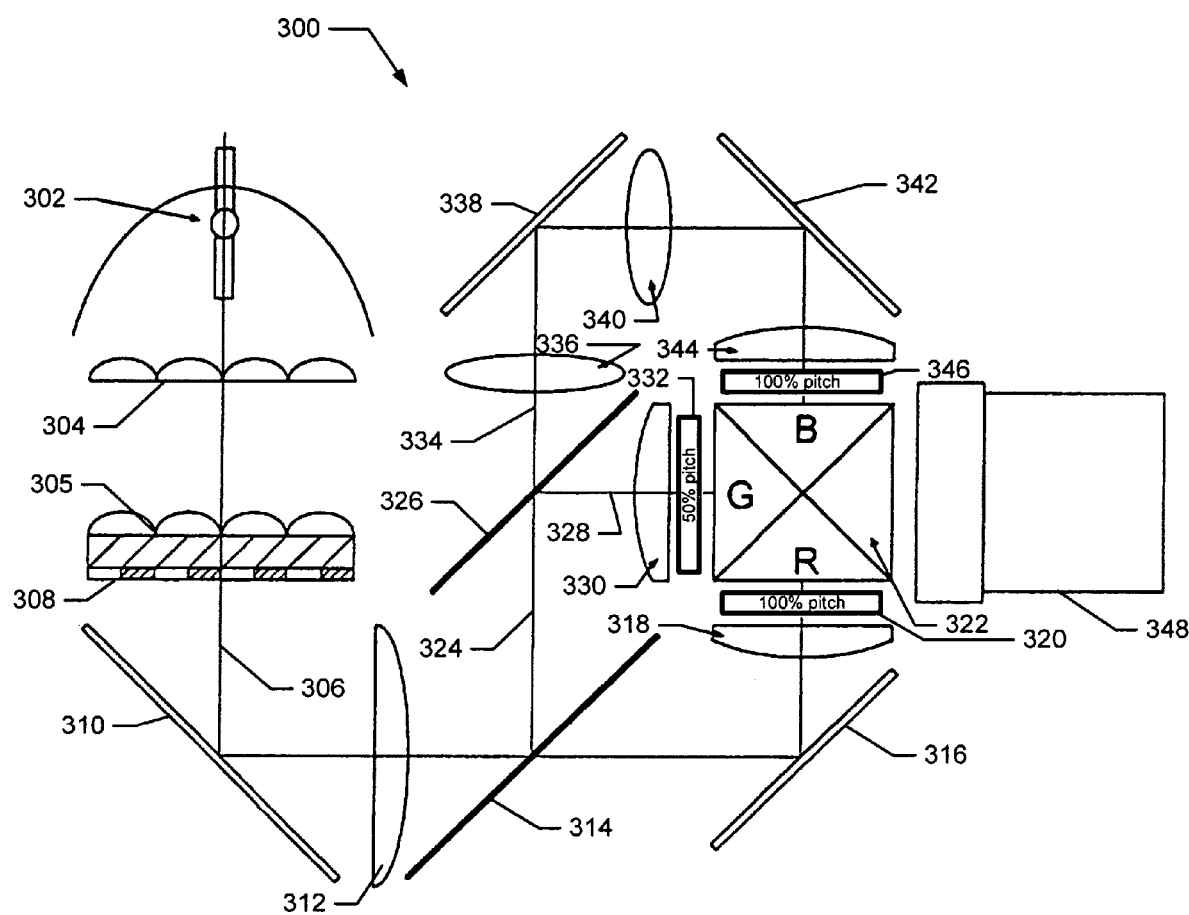
FIG. 3A is schematic illustrating a digital projector implemented using optical components in accordance with one embodiment of the present invention.

FIG. 3A is schematic illustrating a digital projector 300 implemented using optical components in accordance with one embodiment of the present invention. Digital projector 300 can be a portable projector, a stationary projector attached to a ceiling or table, a projector in a rear-projection display system, or another sort of projector. The configuration of the optical elements presented here likewise can vary depending on the design and display requirements and thus FIG. 3 represents describes only one embodiment of the present invention. In this example, digital projector 300 includes a lamp 302, a first lens array 304, a second lens array 305, a polarizing beam splitter 308, polarized white light 306, a first folding mirror 310, a first condenser lens 312, a first dichroic mirror 314, a second folding mirror 316, a second condenser lens 318, a red light valve 320, a x-cube beam combiner 322, blue and green light 324, a second dichroic mirror 326, green light 328, a third condenser lens 330, a green light valve 332, blue light 334, a fourth condenser lens 336, a third folding mirror 338, a fifth condenser lens 340, a fifth folding mirror 342, a sixth condenser lens 344, a blue light valve 346, and a projection lens 348.

In the illustrated embodiment, lamp 302 produces white light containing a spectrum of frequencies most notably including blue, green and red visible light. Lamp 302 includes a substantially parabolic reflector to direct the light in the general direction of first lens array 304. First lens array 304 works in conjunction with second lens array 305 to make the light spatially uniform or homogeneous before further processing is performed. Polarizing beam splitter 308 then converts the white light from the lamp to a uniform polarization as carried by polarized white light 306. This polarized white light 306 is useful when using transmissive LCD panels for light valves as described in further detail later herein. However, alternate embodiments of the present invention may not require polarization using polarizing beam splitter 308 or other type of polarizing element depending on the particular design.

Next, folding mirror 310 reflects polarized white light 306 toward first condenser lens 312, which projects the beam onto first dichroic mirror 314. First dichroic mirror 314 separates out and reflects the blue and green wavelengths into blue and green light 324. The remaining red light passing through first dichroic mirror 314 reflects off second folding mirror 316 toward second condenser lens 318.

Second condenser lens 318 uniformly transmits the red light through red light valve 320. To achieve a lower resolution, one embodiment of the present invention illustrated in FIG. 3A uses red light valve 320 having the same diagonal measure or geometric size but a different pixel pitch than that in green light valve 332. As previously described, the pixel pitch is the distance measurement between the centers of two adjacent pixels. Red light valve 320 modulates the red light at a lower resolution using more widely spaced pixels as it is reflected and combined in x-cube beam combiner 322 for subsequent projection through projection lens 348.

Blue and green light 324 passes to second dichroic mirror 326, which separates and reflects green light 328 toward third condenser lens 330. Third condenser lens 330 transmits green light 328 through green light valve 332. In one embodiment of the present invention, green light valve 332 has a pixel pitch approximately 50% of the pixel pitch of non-green light valves yet has a geometric area measured along a diagonal approximately equal to the non-green light valves. This means there are twice as many pixels per linear unit or four times as many pixels per unit area. These qualities allows green light valve 332 to generate higher resolution green component of the same image size as the non-green components in accordance with embodiments of the present invention. Consequently, green light valve 332 contributes the green component to the final image by selectively passing green light 328 to x-cube beam combiner 322 derived from blue and green light 324. Once again, x-cube beam combiner 322 combines the resulting green light 328 with the other color components for subsequent projection through projection lens 348.

Having separated out green light 328, second dichroic mirror 326 passes blue light 334 on for subsequent processing by blue light valve 344. Initially, fourth condenser lens 336 distributes blue light 334 on third folding mirror 338, which in turn transmits the resulting blue light 334 through fifth condenser lens 340. Next, fifth condenser lens 340 distributes blue light 334 across fifth folding mirror 342 and onto sixth condensing lens 344. These various optics ensure that blue light 334 passes through sixth condensing lens 344 and is evenly distributed across blue light valve 346.

In this particular embodiment, blue light valve 346 is a non-green light valve designed in accordance with one embodiment of present invention and has a larger pixel pitch compared with green light valve 332. In this example, the 100% pixel pitch of blue light valve 346 is approximately twice the pixel pitch of green light valve 332 yet has the same diagonal measurement and covers the same area. Like red light valve 320 described previously, blue light valve 346 modulates the blue light at a lower resolution using more widely spaced pixels as it is reflected and combined in x-cube beam combiner 322 for subsequent projection through projection lens 348.

It is contemplated that alternate optical and other processing arrangements could be generated to operate in the place of x-cube beam combiner 322 that combine the three color component images and direct the resulting color image through projection lens 348. These alternate embodiments would also operate to combine the red component image, the blue component image, and the green component image for projection onto a screen (not illustrated). Further, it is also contemplated that the relative pixel pitch in green light valve 332 compared with the non-green light valves can be a 1:1 ratio or any other ratio and not limited to the ratio illustrated in FIG. 3A and described elsewhere herein.

Figure 3B:
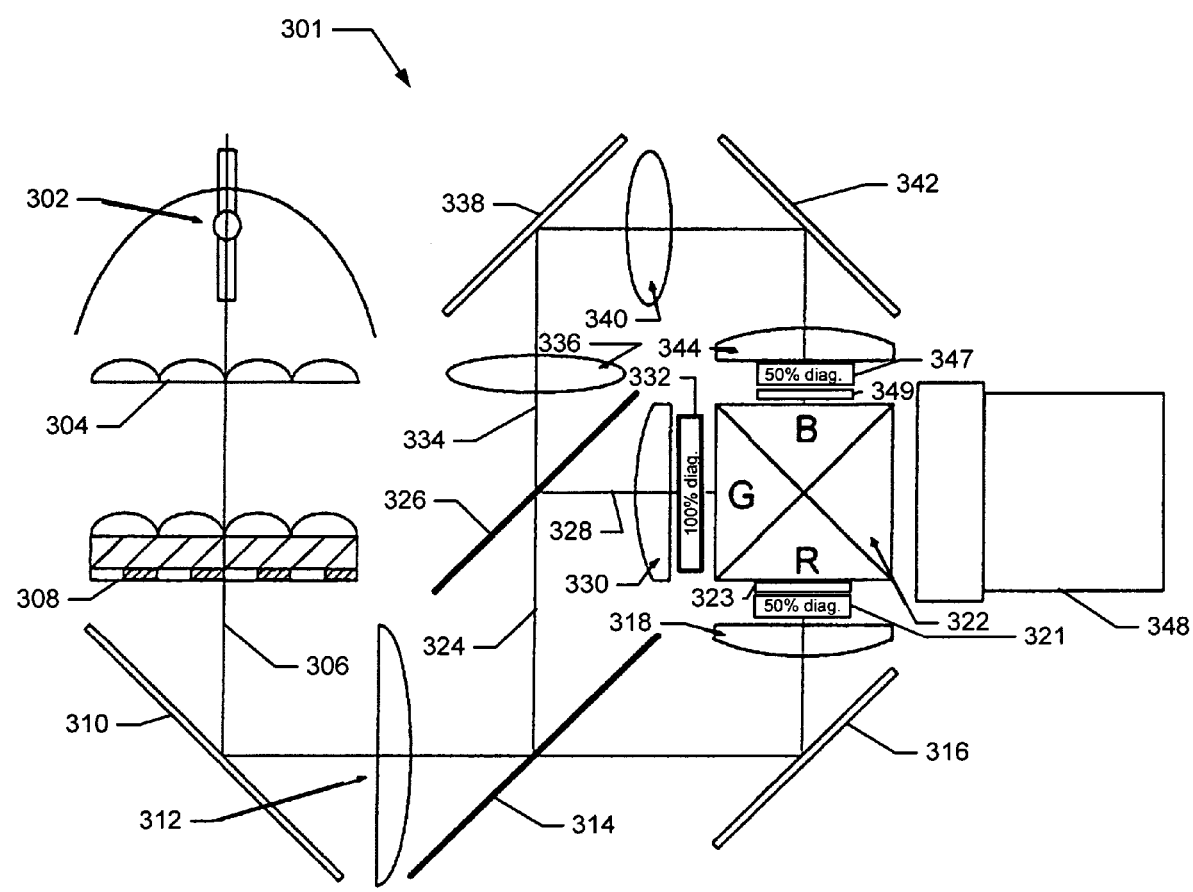
FIG. 3B illustrates a digital projector using non-green light valves with the same pixel pitch and smaller geometric area compared with a green light valve in accordance with another embodiment of the present invention

FIG. 3B illustrates a digital projector 301 using non-green light valves with the same pixel pitch and smaller geometric area compared with green light valve 332 in accordance with another embodiment of the present invention. Digital projector 301 in FIG. 3B includes essentially the same components as digital projector 300 in FIG. 3A except for green light valve 332, red light valve 321, red scaling optics 323, blue light valve and blue scaling optics 349. Except for these aforementioned components, the operation of the digital projector 301 is similar to digital projector 300 as previously described.

Lower resolution non-green light valves are achieved in this embodiment using light valves having a smaller geometric area and substantially the same pixel pitch as the green light valve. In one embodiment, second condenser lens 318 is positioned to place the red component image across red light valve 321. Instead of using the same size light valves, red light valve 321 has a diagonal measurement of approximately 50% compared to that of green light valve 332. Red light valve 321 operates at a lower resolution due to the decreased area and potentially cost less to manufacture and integrate into projector 301. For example, red light valve 321 can be manufactured with a standard pixel pitch substantially the same as green light valve 332 yet at higher volumes and effective yields since it takes up less die area. Red scaling optics 323 are used to change the size of the resulting red component image such that the final red component image is coincident with the green component image albeit at a lower resolution.

Blue light valve 347 in FIG. 3B operates in a similar manner to red light valve 321 previously described. In this case, sixth condenser lens 344 is positioned to pass the blue component image across blue light valve 347 having a diagonal measurement of approximately 50% compared to that of green light valve 332. Like red light valve 321, blue light valve 347 operates at a lower resolution due to the decreased area and also potentially costs less to manufacture and integrate into projector 301. Blue scaling optics 349 change the size of the resulting blue component image such that the final blue component image is coincident with the green component image yet at a lower resolution. It is contemplated that blue scaling optics 349, as well as red scaling optics 321, represents one or more optical elements necessary to correct via enlargement and/or reduction scaling to ensure all color components within the particular colorspace are coincident as they are projected through projection lens 348.

While not illustrated explicitly, it is also contemplated that another embodiment of the present invention varies both the geometric size and pixel pitch of the non-green light valves as well as the degree of scaling performed by scaling optics. Modifications to the light valves and related components in FIG. 3A and FIG. 3B would be applied to generate this latter embodiment. For example, red light valve 320 and blue light valve 346 in FIG. 3A might not only have a different pixel pitch compared with green light valve 332 but also may have different geometric area (i.e., different diagonal measurement) as well. Consequently, projector 300 in FIG. 3A would also require scaling optics illustrated in FIG. 3B and used with red light valve 321 and blue light valve 347. As previously described, this more flexible design would allow combining non-green and green light valves together even though they have different pixel pitch and diagonal measurement. This is useful during manufacture when sourcing light valves from multiple or different manufacturers that each may manufacture light valves with different specifications.

Further, while light valves in the embodiments shown are liquid crystal light valves, it is contemplated that many other techniques for producing the component images could also be used in accordance with embodiments of the present invention. For example, embodiments are possible which incorporate a digital micromirror device (DMD) (such as with wobulation as previously described), a liquid crystal reflector on silicon (LCOS) device, or some other form of spatial light modulator. Spatial light modulators generally operate by either selectively reflecting certain spectrums of light, selectively filtering one or more spectrums of light, or generate one or more spectrums of light in arrays.

Figure 4:
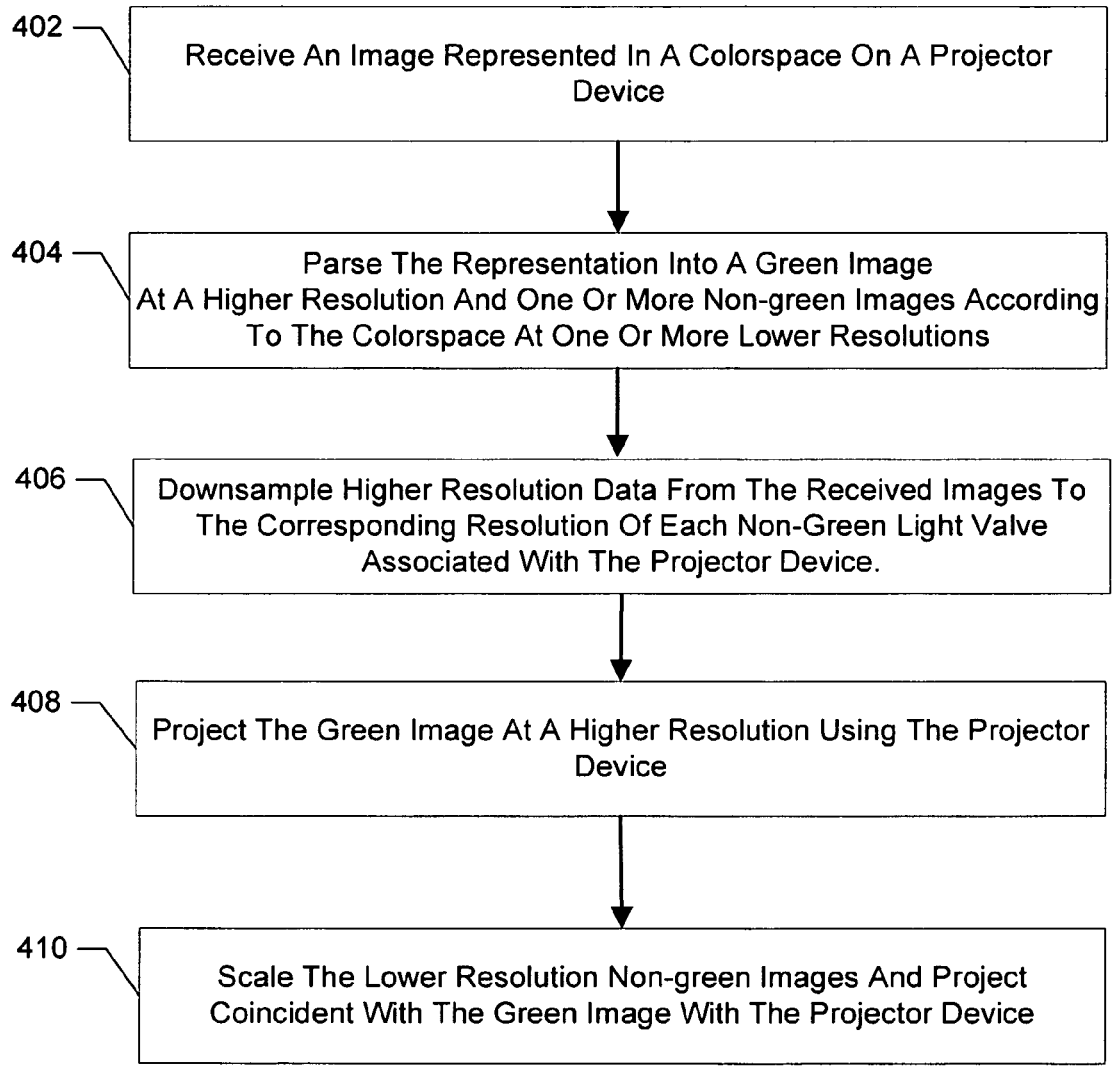
FIG. 4 is a flowchart showing the operations performed by one embodiment of the present invention to project an image.

FIG. 4 is a flowchart showing the operations performed by one embodiment of the present invention to project an image. The projector device receives an image represented in a colorspace on a projector device (402). One or more hardware and software components in the projector operate together to handle any protocol conversion and buffering necessary to facilitate data transmission and communication between an image source and the projector. As previously described, the projector device is capable of receiving a variety of data formats and physical connection standards used in conjunction with both digital images and digital video data.

Embodiments of the present invention parse the digital representation of the image into a green image and one or more non-green images according to the colorspace (404). As previously described, parsing separates the data describing the received images into signals and/or control sequences suitable for use by light valves corresponding to an RGB colorspace or any other colorspace.

In addition, embodiments of the present invention downsample, as necessary, the higher resolution digital data from the received images into the lower resolution corresponding to the particular resolution of each non-green light valve (406). Downsampling the non-green images received in a higher resolution to a lower resolution can be implemented using a pixel averaging algorithm, a region averaging algorithm, a pixel decimation algorithm, a scan-line selection mechanism or other downsampling approaches that are efficient and/or accurate.

For example, one embodiment of the present invention downsamples the red and blue data to a lower resolution compared with high-resolution green images. The lower resolution matches the capabilities of the lower resolution non-green color valves used in the projector device in accordance with embodiments of the present invention. If the non-green light valve have a smaller geometry compared with the green light valve then the reproduction size of the image in the corresponding non-green can require enlargement to the size of the green light valve color component produced.

Next, the projector device projects the green image at a higher resolution using the projector device (408). As previously described, the green light valve creating the green image is a higher resolution light valve capable of producing higher resolution green component images that also appear larger in size. Unlike the red and blue component images, the green component image does not need to be scaled up in one embodiment of the present invention before being combined and projected along with non-green color image components.

The non-green images are scaled up as needed and projected at one or more lower resolutions coincident with the green image (408). One embodiment of the present invention passes the lower resolution non-green images through scaling optics that scale up the image sizes being generated at the lower resolution to the size of the image or images being generated at the higher resolution. For example, a red component image and a blue component image produced by smaller area light valves can be scaled up using respective scaling optics in accordance with implementations of the present invention. As previously described, the non-green light valves can be the same or different pixel pitch depending on the design requirements.

Once they are scaled properly, the red component image and blue component image are then combined with the green component images and used to generate the color image. As previously described, the green and non-green images can be combined within the projector using combination optics or alternatively could be combined outside the projector. In the latter embodiment, the combination operation would require one to mechanically target the various green and non-green images to converge at a specific distance outside the projector thus incurring more setup time and potential delays before using.

Figure 5:
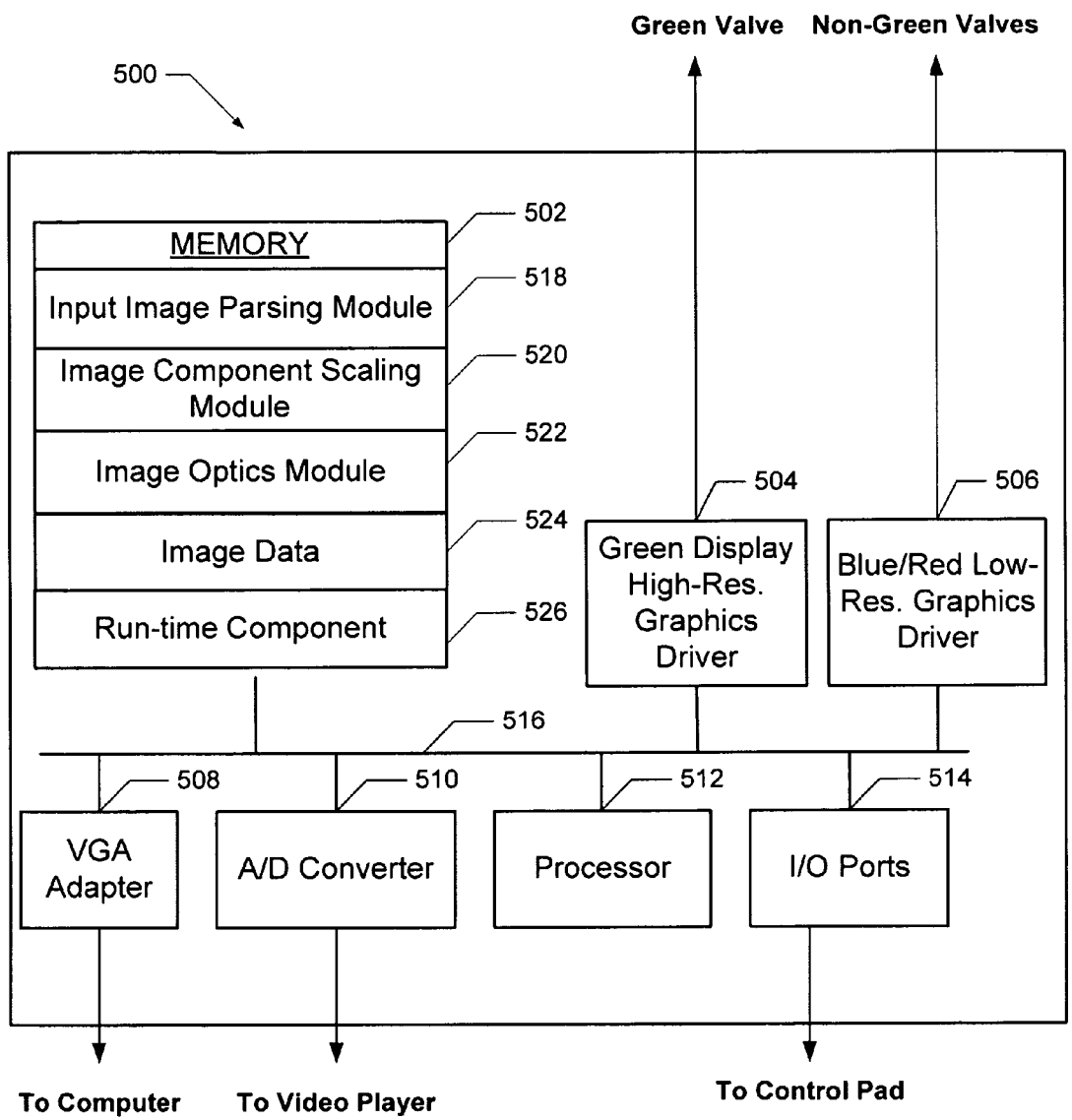
FIG. 5 is a diagram showing the components for processing and displaying an image in one embodiment of the present invention.

FIG. 5 is a block diagram showing the components for processing and displaying of an image in one embodiment of the present invention. System 500 includes a memory 502 to hold executing programs (typically random access memory (RAM) or read-only memory (ROM) such as a flash ROM), a green display high resolution graphics driver 504, a blue and red low-resolution graphics driver 506, a VGA input adapter 508, an analog-to-digital (A/D) converter 510, a processor 512, and one or more input/output (I/O) ports 514, operatively coupled together over an interconnect 516. System 500 can be preprogrammed, in ROM, for example, using field-programmable gate array (FPGA) technology or it can be programmed (and reprogrammed) by loading a program from another source (for example, from a floppy disk, a CD-ROM, or another computer). In addition, system 500 can be implemented using customized application specific integrated circuits (ASICs).

The embodiment shown can receive video and image data from separate sources. VGA adapter 508 can accept signals from a standard computer output providing VGA, SVGA or other compatible signal formats or protocols. In one embodiment, analog to digital (A/D) converter 510 receives component video from a device such as a VCR or tuner, and then converts the image data into commands and/or signals to generate digital images in accordance with embodiments of the present invention.

Processor 512 executes the instructions contained in memory 502 to modify image data 524 cached in memory 502. The processor passes image data 524 to the one or more high-resolution and low-resolution graphics drivers corresponding to the light valves. Input image parsing module 518 separates the component colors from the received image into separate component color images and downsamples from the input image to lower resolutions as required to match the particular light valve resolutions. Image component scaling module 520 scales the images produced by the lower resolution light valves to correspond to the higher resolution light valves. As previously described, one embodiment of the present invention scales up the lower resolution blue and red component images produced by the blue and red light valves to match the size of the green component images. While optical operations can be performed using optics and hardware, one embodiment of the present invention can simulate one or more image or optical operations in software using image optics module 522. For example, image optics module 522 can perform image inversion operations to correct orientation of images as they pass through one or more optical elements like the optical scaling components of the projector.

Moreover, embodiments of the invention can be implemented using digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks.

Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

Embodiments of the present invention provided herein are example implementations and by no means meant to limit the scope or application of the present invention. For example, different aspects of image preparation can occur either within the projector or outside the projector. For instance, an attached computer may transmit the color components at different resolutions and/or refresh rates to the projector in accordance with embodiments of the present invention. Alternatively, the projector itself may first parse and then scale the component images to the appropriate resolution. If the optics used to scale the lower-resolution component images causes an inversion of the images, hardware or software designed in accordance with embodiments of the present invention may perform a corrective inversion before the component images are received by the projector.

Further, embodiments of the present invention are not limited to the specific embodiments described above. For instance, a projector using the various light valve technologies are described previously however it is contemplated that newly developed technologies for light valves not described expressly herein could be adapted and used in conjunction with embodiments of the present invention.

Different colorspaces and decompositions into color images are also possible other than red, green and blue. Additionally, the terms "red," "blue," and "green" are used here as shorthand for the frequencies used in a typical RGB device even though the photoreceptors of the human eye do not measure specific frequencies, but rather have broad response curves. Accordingly, different light values having different frequency characteristics and ways of dividing up the color components of the image are also contemplated.

Thus, the invention is not limited to the specific embodiments described and illustrated above. Instead, the invention is construed according to the claims that follow.

What is claimed is:

1. An apparatus for projecting images comprising:
   an image receiving component that receives an image represented in a colorspace;

a parsing component that processes the image represented in the colorspace as two or more color image components in different resolutions including a green color image component at a higher resolution and one or more non-green color image components at one or more lower resolutions; and two or more light valves having different resolutions and capable of modulating the image from the two or more color image components in their corresponding different resolutions.

2. The apparatus of claim 1 wherein the two or more light valves having different resolutions further comprise a green light valve capable of operating at a higher resolution and one or more non-green light valves capable of operating at one or more lower resolutions.

3. The apparatus of claim 1, wherein the parsing component is selected from a set of parsing components including: a software program, an analog circuit, and a digital circuit.

4. The apparatus of claim 1, wherein the parsing component further includes a downsample component capable of downsampling the representation of the image in the colorspace into one or more lower resolution non-green image color components.

5. The apparatus of claim 4, wherein the downsampling is performed using one or more downsampling components selected from a set including: a pixel averaging component, a region averaging component, a pixel decimation component, and a scan-line selection component.

6. The apparatus of claim 1, wherein the image is a still image selected from a set of still image formats including: GIF, JPEG, or TIF.

7. The apparatus of claim 1, wherein the electronic image receiving component facilitates connectivity and transmission of signal corresponding to the image using one or more formats from a set including: NTSC, PAL, and SECAM.

8. The apparatus of claim 1, wherein the image is a digital video image in a format selected from a set of formats including: MPEG, AVI, RM, ASF, WMV, Divx, VCD, SVCD, and DVD.

9. The apparatus of claim 1, wherein the light valves are selected from a set of light valves including: a digital micromirror device (DMD), a liquid crystal display (LCD) device, a diffractive light device (DLD), and a liquid crystal on silicon (LCoS) device.

10. The apparatus of claim 1, further comprising a scaling component that ensures the two or more light valves with different resolutions produces two or more color image components of the same size and coincident when projected.

11. The apparatus of claim 10 wherein the scaling component further comprises optics that scale a lower resolution color image component to substantially the same size of a higher resolution color component and suitable for combination together into a single image to be projected.

12. The apparatus of claim 1, wherein the two or more light valves with different resolutions also have different pixel pitch as measured between the centers of adjacent pixels.

13. The apparatus of claim 1, wherein the two or more light valves with different resolutions also cover different size geometric areas.

14. A method for projecting images comprising:
receiving an image represented in a colorspace onto a projector device;
parsing the image into two or more color image components of the colorspace having two or more different resolutions including a green color image component at a higher resolution and one or more non-green color image components at one or more lower resolutions; and
projecting the two or more color image components of the colorspace in two or more different resolutions superimposed and coincident with each other to make the image.

15. The method of claim 14 wherein the two or more color image components in two or more different resolutions are projected using light valves having two or more different resolutions.

16. The method of claim 15 further comprising a green light valve capable of operating at a higher resolution and one or more non-green light valves capable of operating at one or more lower resolutions.

17. The method of claim 15, wherein the light valves are selected from a set of light valves including: a digital micromirror device (DMD), a liquid crystal display (LCD) device, and a liquid crystal reflector on silicon (LCoS) device.

18. The method of claim 16, wherein the parsing further includes downsampling the representation of the image in the colorspace into one or more lower resolution non-green image color components.

19. The method of claim 18, wherein the downsampling is performed using one or more downsampling operations selected from a set of operations including: a pixel averaging operation, a region averaging operation, a pixel decimation operation, and a scan-line selection operation.

20. The method of claim 14, wherein the image is a still image selected from a set of still image formats including: GIF, JPEG, or TIF.

21. The method of claim 14, wherein the receiving facilitates connectivity and transmission of signal corresponding to the image using one or more formats from a set including: NTSC, PAL, and SECAM.

22. The method of claim 14, wherein the image is a digital video image in a format selected from a set of formats including: MPEG, AVI, RM, ASF, WMV, Divx, VCD, SVCD, and DVD.

23. The method of claim 14, further comprising a scaling operation that ensures the two or more light valves with different resolutions produces two or more color image components of the same size and coincident when projected.

24. The method of claim 23 wherein the scaling operation is performed using optics that scales up a lower resolution color image component to substantially the same size of a higher resolution color component and suitable for combination together into a single image to be projected.

25. The method of claim 14, the two or more light valves with different resolutions also have different pixel pitch as measured between the centers of adjacent pixels.

26. The method of claim 14, wherein the two or more light valves with different resolutions also cover different size geometric areas.

27. A machine-readable storage device embodying a computer program product for projecting images, readable by a programmable processor, and comprising instructions operable to cause the programmable processor to:
receive an image represented in a colorspace onto a projector device;
parse the image into two or more color image components of the colorspace in two or more different resolutions including a green color image component at a higher resolution and one or more non-green color image components at one or more lower resolutions; and project the two or more color image components of the colorspace in two or more different resolutions superimposed and coincident with each other to make the image.

28. The machine-readable storage device embodying the computer program product of claim 27, wherein the two or more color image components in two or more different resolutions are projected using light valves having two or more different resolutions.

29. The machine-readable storage device embodying the computer program product of claim 28, wherein the light valves are selected from a set of light valves including: a digital micromirror device (DMD), a liquid crystal display (LCD) device, and a liquid crystal reflector on silicon (LCoS) device.

30. The machine-readable storage device embodying the computer program product of claim 28, further comprising instructions that scale the two or more color image components in two or more different resolutions to ensure that the two or more light valves with different resolutions produce two or more color image components of the same size and coincident when projected.

31. The machine-readable storage device embodying the computer program product of claim 30 wherein the instructions used to scale operate with optics that scales up a lower resolution color image component to substantially the same size of a higher resolution color component and suitable for combination together into a single image to be projected.

32. The machine-readable storage device embodying the computer program product of claim 28 further comprising instructions that drive a green light valve capable of operating at a higher resolution and one or more non-green light valves capable of operating at one or more lower resolutions.

33. The machine-readable storage device embodying the computer program product of claim 27, wherein the instructions that parse the image further includes instructions that downsample the representation of the image in the colorspace into one or more lower resolutions non-green image color components.

34. The machine-readable storage device embodying the computer program product of claim 33, wherein the instructions that downsample are implemented using one or more downsampling operations selected from a set of operations including: a pixel averaging operation, a region averaging operation, a pixel decimation operation, and a scan-line selection operation.

35. The machine-readable storage device embodying the computer program product of claim 27, wherein the image is a still image selected from a set of still image formats including: GIF, JPEG, or TIF.

36. The machine-readable storage device embodying the computer program product of claim 27, wherein the instructions that receive facilitate connectivity and transmission of signal corresponding to the image using one or more formats from a set including: NTSC, PAL, and SECAM.

37. The machine-readable storage device embodying the computer program product of claim 27, wherein the image is a digital video image in a format selected from a set of formats including: MPEG, AVI, RM, ASF, WMV, Divx, VCD, SVCD, and DVD.

38. The machine-readable storage device embodying the computer program product of claim 27, wherein the two or more light valves with different resolutions also have different pixel pitch as measured between the centers of adjacent pixels.

39. The machine-readable storage device embodying the computer program product of claim 27, wherein the two or more light valves with different resolutions also cover different size geometric areas.

40. An apparatus for projecting images comprising:
means for receiving an image represented in a colorspace onto a projector device;
means for parsing the image into two or more color image components of the colorspace having two or more different resolutions including a green color image component at a higher resolution and one or more non-green color image components at one or more lower resolutions; and
means for projecting the two or more color image components of the colorspace in two or more different resolutions superimposed and coincident with each other to make the image.

41. An apparatus for projecting images comprising:
an image receiving component that receives an image;
a parsing component that processes the image as two or more color image components in different resolutions; and
a spatial light modulator capable of having different resolutions and capable of modulating the image from the two or more color image components in their corresponding different resolutions wherein the spatial light modulator is capable of being wobulated.

42. An apparatus for projecting images comprising:
an image receiving component that receives an image;
a parsing component that processes the image as two or more color image components in different resolutions; and
a spatial light modulator capable of having different resolutions and capable of modulating the image from the two or more color image components in their corresponding different resolutions wherein the two or more color image components include a green image and a blue image and wherein the spatial light modulator modulates the green image at a higher resolution than the blue image.

* * * * *